(12) United States Patent
Pechtchanski et al.

(10) Patent No.: US 7,089,403 B2
(45) Date of Patent: Aug. 8, 2006

(54) SYSTEM AND METHOD FOR USING HARDWARE PERFORMANCE MONITORS TO EVALUATE AND MODIFY THE BEHAVIOR OF AN APPLICATION DURING EXECUTION OF THE APPLICATION

(75) Inventors: Igor Pechtchanski, Emerson, NJ (US); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/180,811

(22) Filed: Jun. 26, 2002

(65) Prior Publication Data
US 2004/0003384 A1 Jan. 1, 2004

(51) Int. Cl.
G06F 9/38 (2006.01)
G06F 9/45 (2006.01)

(52) U.S. Cl. .................................. 712/216; 712/227
(58) Field of Classification Search ................ 712/216, 712/23, 217, 227; 717/158, 153, 146
See application file for complete search history.

(56) References Cited

U.S. PATENT DOCUMENTS

| | | | |
|---|---|---|---|
| 5,845,310 A * | 12/1998 | Brooks | ........................... 711/3 |
| 6,164,841 A * | 12/2000 | Mattson et al. | ................. 716/1 |
| 6,223,340 B1 | 4/2001 | Detlefs | |
| 6,295,644 B1 * | 9/2001 | Hsu et al. | .................... 717/158 |

OTHER PUBLICATIONS

J. Whaley, "Partial Method Compilation using Dynamic Profile Information", Proceedings of OOPSLA '01, Oct. 2000 (Tampa, FL), pp. 166-179.

A. Matthew, et al., "Adaptive Optimization in the Jalapeño JVM", Proceedings of OOPSLA '00. Oct. 2000 (Minneapolis, MN), pp. 47-64.

J. Dean, et al., "ProfileMe: Hardware Support for Instruction-Level Profiling on Out-of-Order Processors", 30th Symposium on Micr architecture (Micro-30), Dec. 1997.

(Continued)

*Primary Examiner*—Henry W. H. Tsai

(74) *Attorney, Agent, or Firm*—Scully, Scott, Murphy & Presser, P.C.; Marian Underweiser, Esq.

(57) ABSTRACT

There is provided a method, system and program storage device for utilizing a hardware performance monitors for improving performance of an application comprising a plurality of instructions while the application is executing on a micro-architecture, comprising: creating a machine internal representation (MIR) for the plurality of instructions or a subset thereof for the hardware and generating an executable (EXE) from the MIR for execution on the hardware; determining hardware performance monitor (HPM) information for an event associated with a resource of the hardware during execution of the EXE to identify one or more instructions of the application that affect the execution of the application on the hardware; re-computing the MIR according to the HPM information; and re-generating the EXE from the re-computed MIR for execution on the hardware if the MIR and the re-computed MIR are different, thereby improving utilization of the resource by the application. Also provided is a hardware performance monitor (HPM) subsystem for improving performance of an application comprising a plurality of instructions while the application is executing on a hardware.

27 Claims, 13 Drawing Sheets

OTHER PUBLICATIONS

J. Anderson, et al., "Continuous Profilling: Where Have All the Cycles Gone?", ACM Transactions on Computer Systems, vol. 15, No. 4, Nov. 1997, pp. 357-390.

"PowerPC 604e: RISC Microprocessor User's Manual", Chapter 9, Mar. 1998, pp. 9-1-9-16.

Ammons, et al., "Exploiting Hardware Performance Counters with Flow and Context Sensitive Profiling", 1997 ACM SIGPLAN Conference on Programming Language Design and Implementation, Las Vegas, Nevada, Jun. 15-18, 1997, pp. 1-12.

Lindenmaier, et al., "Load Scheduling with Profile Information", EU Project 28198; NSF grants EIA-9726401, CDA-9502639, and a CAREER Award CCR-9623209; Darpa grant 5-21425; and Compaq., pp. 1-11.

* cited by examiner

400

```
for (i=2; i<i_limit; i++) {
    for (j=1; j<j_limit; j++) {
        A[i] = A[i-1] + A[i+1];   402
        k = j_limit - j;          404
        C[i,j] = i + C[i,k];      406
    }
}
```

401 brackets the three statements 402, 404, 406.

Figure 4

SYSTEM AND METHOD FOR USING HARDWARE PERFORMANCE MONITORS TO EVALUATE AND MODIFY THE BEHAVIOR OF AN APPLICATION DURING EXECUTION OF THE APPLICATION

BACKGROUND OF THE INVENTION

1. Technical Field of the Invention

The present invention generally relates to compiler systems. More particularly, the present invention is directed to an adaptive optimization system and method for utilizing hardware performance monitors to improve an application's performance during its execution on a particular micro-architecture.

2. Description of the Prior Art

With rapidly changing hardware, modem compilers have to target a variety of architectures or architecture implementations. To make this task easier, most compilers consist of an architecture-independent frontend section and an architecture-specific backend section the result of which is an executable application. More particularly, while the frontend section transforms a source application into an intermediate representation (i.e., "IR"), the backend section transforms the IR generated by the frontend section into a sequence of machine instructions (i.e., instruction schedule) for a particular instruction set architecture (i.e., "ISA"), such as PowerPC, which is to be executed on a specific implementation of the ISA (i.e., micro-architecture), such as PowerPC 604e.

Typically, the backend section views the particular ISA as a collection of resources (e.g., caches, registers and the like) and constraints between them, which comprise a micro-architectural model for the particular ISA. The backend section utilizes the micro-architectural model to select a "better" instruction schedule, which takes the fewest clock cycles to execute. In general, the more precise the micro-architectural model the better the instruction schedule that can be generated by the backend section, but the more time that is required by the backend section to generate the instruction schedule. It is noted that the increase in time associated with generating a better instruction schedule is often nonlinear. Notwithstanding the preciseness of the micro-architectural model actually used, it will nevertheless have some imprecision, if for no other reason than some facts that are dependent on the application's execution behavior are impossible to ascertain at compile time, such as the location of data in main memory and the like.

Various compilers exist: static and dynamic. For static compilers, where the instruction schedule is generated before the application executes and the cost of compilation is amortized over many application executions, the execution time of the backend section is less important and the precision of the micro-architectural model is more important because the static compiler has only one opportunity to guess the correct schedule of instructions. If the guess is wrong, the consequence is poor performance of the application during its execution. For dynamic compilers, the instruction schedule is generated at application execution time and the compilation time is counted as part of the application's execution time. Typically, with the dynamic compiler the precision of the micro-architectural model is not as important as the saving of the execution time and thus the precision of the micro-architectural model may be sacrificed in lieu of savings in the execution time. One such compiler is a just-in-time (i.e., "JIT") compiler, which compiles/optimizes the application only once. Just like the static compiler, the JIT has only one opportunity to guess the instruction schedule and the making of an incorrect "guess" may also lead to poor application performance during application execution. An alternative dynamic compilation strategy is an adaptive optimization system (i.e., "AOS"). In the AOS, the backend section of the compiler has an opportunity to "guess" multiple times to try to get a better instruction schedule. After guessing, the AOS may evaluate the guess and guess again if appropriate, thereby helping to eliminate poor application performance due to one or more bad guesses. Furthermore, the backend section may only have to guess again for parts of the application that have the potential to make a performance difference, and for these parts the backend section can spend more time on compilation because they are a small fraction of the total application size.

Many of the currently available microprocessors provide hardware performance monitors (i.e., "HPMs"), which count a number of times that a micro-architectural event that captures some behavior of a particular micro-architectural resource occurs on the micro-architecture. For example, the typical micro-architectural resources that may be counted may include caches or functional units within a micro-architecture. Functional units represent stages in a pipelined superscalar micro-architecture. The stages may include fetch/decode, dispatch, execute and complete on the particular micro-architecture. The execute stage may include integer and floating-point units, as well as branch and load/store units. The typical events that may be counted include the number of times a micro-architectural resource starts, completes and stalls. For example, an instruction's execution may stall if a value that is an input to the instruction at the time of execution is not available, or if an underlying micro-architectural resource that is required by the instruction is not yet available. The HPMs may be used to generate offline information, which determines where execution time is spent in the application and which may be used to identify parts of the application that should be modified to improve micro-architectural resource utilization. In order to generate offline information, the application is executed to collect HPM data and after the application completes, the HPM data is analyzed to determine how to modify the application's behavior for subsequent executions of the application.

A drawback associated with utilizing offline HPM data from one execution to modify the behavior of an application for subsequent executions is that the modification may not result in improved performance of the application when subsequent executions have different behaviors. For example, the application's behavior may differ from one execution to the next because of the different input to the application. In addition, because offline information is aggregated, the behavior of individual application components may not be obvious. For example, if an application has phase shifts, the phases may not be apparent in the offline information that is collected across all phases. Therefore, offline information may be imprecise and thus may not be useful for modifying application behavior.

FIG. 1 illustrates prior art compiler system 100 without use of hardware performance monitors. The compiler system 100 comprises a static compiler 116, which includes frontend 104, intermediate representation (i.e., "IR") 106, selection/scheduling heuristics 108, machine model 110 and backend 112, all of which are described in detail below. In the compiler system 100, the source code 102 represents an application's source code, which is to be compiled by the static compiler 116. The frontend section 104 of the static compiler 116 takes as input or reads in the application's source code 102, parses the source code 102 and generates an IR 106, which breaks down instruction in the source code 102 into a plurality of low-level abstract operations that are more conducive to optimization. The IR 106 is a sequence of operations that has implied data and control dependencies between the operations. For example, on a reduced instruction set computer (i.e., "RISC") microprocessor, the low-level abstract operations comprise loads and stores of memory values into registers and subsequent computations on the values in the registers. It is noted that at this point, the registers are symbolic registers, which are subsequently translated into actual hardware registers by the backend section 112. The backend section 112 of the static compiler 116 reads in the IR 106 and generates an executable (i.e., "EXE") 114, which represents a schedule of macro-architectural instructions, i.e., assembly language instructions for a particular instruction set architecture ISA, e.g., PowerPC. As aforementioned, the ISA defines a particular target architecture to which a user-level application must conform. More particularly, the backend section 112 selects micro-architectural instructions for the IR operations 106, orders the instructions via instruction scheduling and maps symbolic registers into physical registers via register allocation.

Further with reference to FIG. 1, during EXE 114 generation, the backend section 112 consults the machine model 110, which describes characteristics about the particular target micro-architecture, e.g., PowerPC 604e. For example, the machine model 110 may include micro-architectural resources that are available (e.g., fetch/decode, dispatch, execute, and complete phases of a pipelined superscalar microprocessor), a number of instances of a particular micro-architectural resource (e.g., there may be a number of integer functional units which partially comprise the execute stage), and clock cycles that are required for a value to flow from one micro-architectural resource to another (e.g., the number of cycles for an instruction to be executed after it has been dispatched). More particularly, the machine model 110 provides detailed information about the underlying micro-architecture that the backend 112 uses to determine latencies and constraints between instructions for a particular instruction schedule. For example, if the expected latency or delay of an instruction is d clock cycles for a particular micro-architectural resource, then the backend 112 will attempt to schedule all instructions that are dependent on the value generated by the instruction at least d clock cycles later. Furthermore, if there is more than one integer functional unit, the backend 112 may schedule more than one integer instruction to be executed in the same clock cycle.

Yet further with reference to FIG. 1, in addition to the machine model 110, the backend 112 further consults selection/scheduling heuristics 108, which are used for instruction selection and instruction scheduling in the EXE 114. For example, there may be a plurality of instructions that could be selected at any given time and the heuristics 108 help the backend section 112 select the optimal instructions among the plurality of instructions so that the instruction schedule will finish executing in the fewest possible number of clock cycles on the particular target micro-architecture. One goal of the backend 112 is to generate a "valid" instruction schedule that orders the instructions so that their execution will maintain the data dependencies between instructions. For example, if the value generated by executing instruction A is used by instruction B, then instruction A must be scheduled for execution before instruction B.

In view of the foregoing, there is a need in the art for providing a system and method for utilizing hardware performance monitors to evaluate and modify the behavior of an application during its execution. More particularly, there is a need in the art for providing an adaptive optimization system and method for utilizing hardware performance monitors to improve an application's performance while the application is executing.

SUMMARY OF THE INVENTION

The present invention is directed to a system and method for utilizing hardware performance monitors to evaluate and modify the behavior of an application while the application is executing.

It is an object of the present invention to provide an adaptive optimization system and method for utilizing hardware performance monitors to improve an application's performance while the application is executing.

It is another object of the present invention to provide a dynamic compiler for utilizing hardware performance monitors to improve an application's performance while the application is executing.

It is a further object of the present invention to provide a dynamic compiler in an adaptive optimization system for utilizing hardware performance monitors to improve an application's performance while the application is executing.

It is a still a further object of the present invention to provide a controller in an adaptive optimization system for utilizing hardware performance monitors for directing a dynamic compiler to improve an application's performance while the application is executing.

According to an embodiment of the present invention, there is provided a method for utilizing a hardware performance monitor for improving performance of an application comprising a plurality of instructions while the application is executing on a micro-architecture, the method comprising the steps of: creating a machine internal representation (MIR) for the plurality of instructions or a subset thereof for the micro-architecture and generating an executable (EXE) from the MIR for execution on the micro-architecture; determining hardware performance monitor (HPM) information for an event associated with a micro-architectural resource of the micro-architecture during execution of the EXE to identify one or more instructions of the application that affect the execution of the application on the micro-architecture; re-computing the MIR according to the HPM information; and re-generating the EXE from the re-computed MIR for execution on the micro-architecture if the MIR and the re-computed MIR are different, thereby improving utilization of the micro-architectural resource by the application.

According to another embodiment of the present invention, there is provided a system for utilizing a hardware performance monitor for improving performance of an application comprising a plurality of instructions while the application is executing on a micro-architecture, the system comprising: a compiler for generating a machine internal representation (MIR) for the plurality of instructions or a subset thereof for the micro-architecture and generating an executable (EXE) from the MIR for execution on the micro-architecture; a hardware performance monitor (HPM) subsystem for determining HPM information for an event associated with a micro-architectural resource of the micro-architecture during execution of the EXE to determine one or more instructions of the application that affect the execution of the application on the micro-architecture; and a controller for re-computing the MIR according to the HPM information and directing the compiler to re-generate the EXE from the re-computed MIR for execution on the micro-architecture if the MIR and the re-computed MIR are different, thereby improving utilization of the micro-architectural resource by the application.

According to a further embodiment of the present invention, there is provided a program storage device, tangibly embodying a program of instructions executable by a machine to perform a method for utilizing a hardware performance monitor for improving performance of an application comprising a plurality of instructions while the application is executing on a micro-architecture, the method comprising the steps of: creating a machine internal representation (MIR) for the plurality of instructions or a subset thereof for the micro-architecture and generating an executable (EXE) from the MIR for execution on the micro-architecture; determining hardware performance monitor (HPM) information for an event associated with a micro-architectural resource of the micro-architecture during execution of the EXE to identify one or more instructions of the application that affect the execution of the application on the micro-architecture; re-computing the MIR according to the HPM information; and regenerating the EXE from the re-computed MIR for execution on the micro-architecture if the MIR and the re-computed MIR are different, thereby improving utilization of the micro-architectural resource by the application.

According to yet a further embodiment of the present invention, there is provided a hardware performance monitor (HPM) subsystem for improving performance of an application comprising a plurality of instructions while the application is executing on a hardware, the HPM subsystem comprising: a means for receiving a request from a dynamic compiler system to determine HPM information for an event associated with a resource of the hardware during execution of an executable (EXE) associated with the plurality of instructions or a subset of the application to identify one or more instructions of the application that affect the execution of the application on the hardware; and a means for providing the determined HPM information to the dynamic compiler system to re-generate the EXE according to the HPM information for execution on the hardware, thereby improving utilization of the resource by the application.

BRIEF DESCRIPTION OF THE DRAWINGS

The objects, features and advantages of the present invention will become apparent to one skilled in the art, in view of the following detailed description taken in combination with the attached drawings, in which:

FIGS. 4–12 represent a series of exemplary illustrations that depict the application of hardware performance monitors by an adaptive optimization system to improve performance of an application according to the present invention.

DETAILED DESCRIPTION OF THE PREFERRED EMBODIMENT OF THE INVENTION

The present invention is directed to an adaptive optimization system and method for utilizing hardware performance monitors to improve an application's performance while the application is executing.

Figure 1:
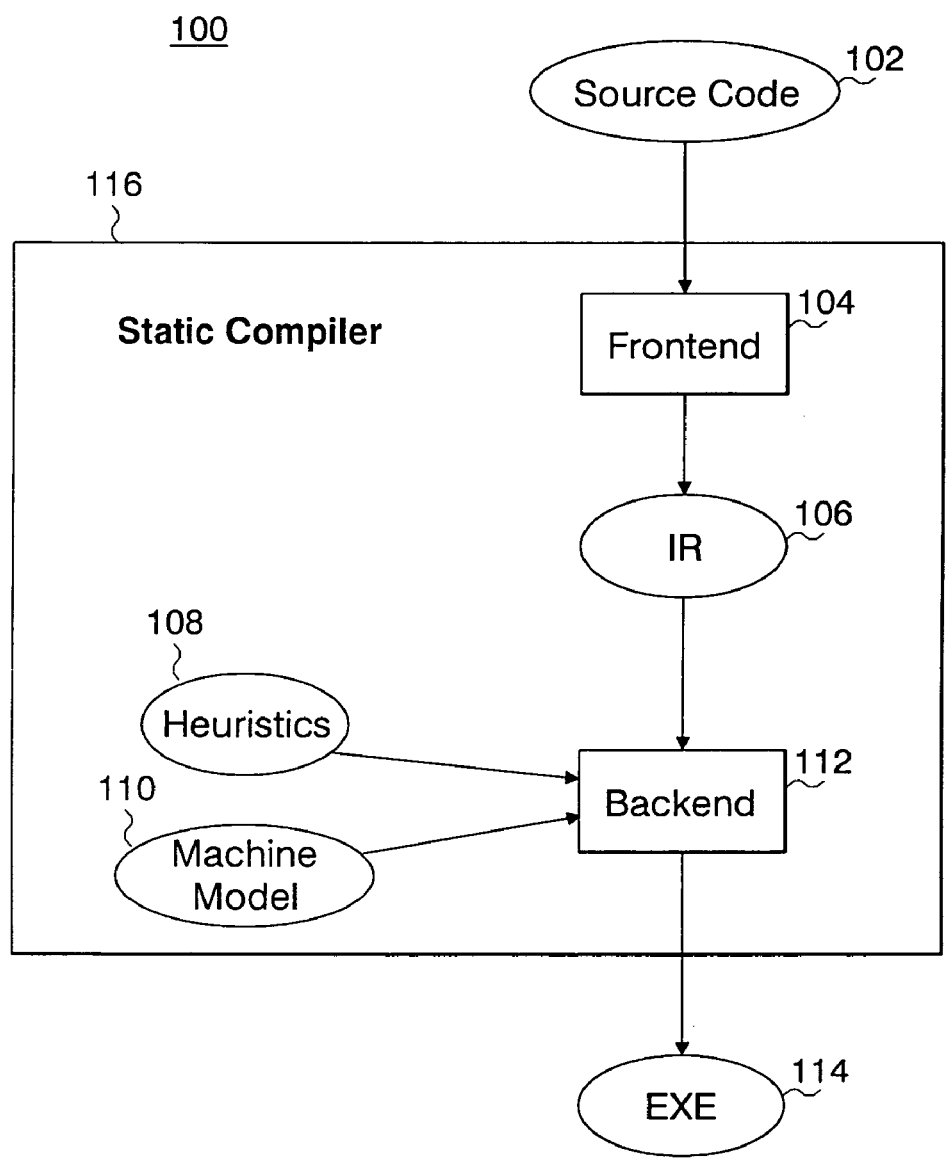
FIG. 1 illustrates a prior art compiler system without use of hardware performance monitors.
Figure 2:
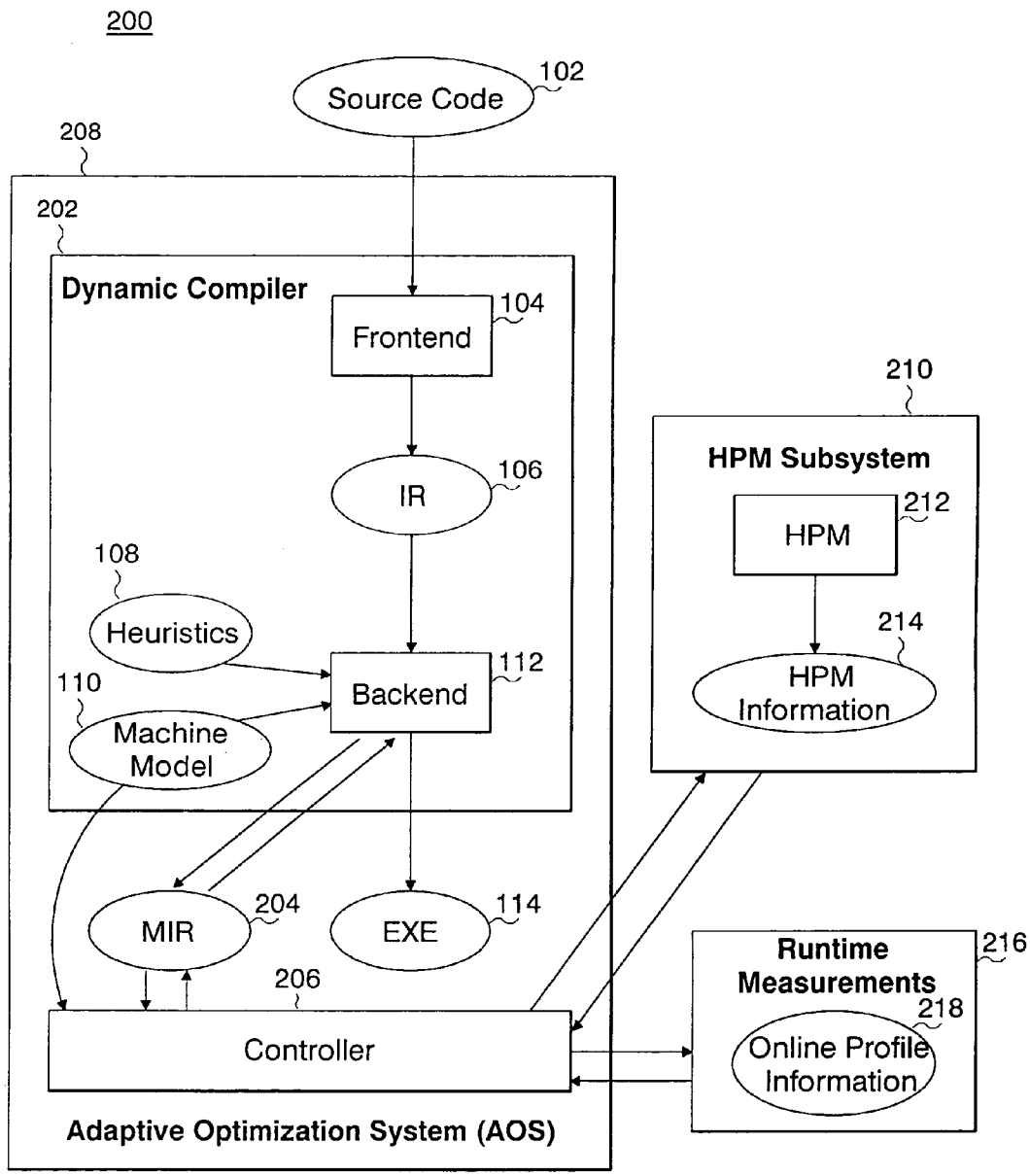
FIG. 2 is an exemplary illustration of an adaptive optimization system of a dynamic compiler system using hardware performance monitors to improve performance of an application according to the present invention.

FIG. 2 is an exemplary illustration of a compiler system 200, which comprises an adaptive optimization system (i.e., "AOS") 208 that utilizes a hardware performance monitor (i.e., "HPM") subsystem 210 to improve performance of an application, according to the present invention. It is noted that components 102 through 114 of the compiler system 200 are analogous with the like components of the prior art compiler system 100, illustrated above in FIG. 1. A distinction between the compiler system 200 according to the present invention and the prior art compiler system 100 is that the components 102 through 114 according to the invention are part of a dynamic compiler 202 and analogous components of the prior art compiler system 100 are part of the static compiler 116. Unlike the static compiler 116, which compiles the entire source of an application before the application is executed, the dynamic compiler 202 compiles a portion of the source code 102 of the application when that portion is executed at the application's execution time. Consequently, each time the application executes on the micro-architecture, either different or the same portions of the source code 102 of the application are compiled. Typically, the portion or unit of compilation is a method. Thus, the EXE 114 generated by the dynamic compiler 200 represents an executable for a method. It is noted, however, that one skilled in the art may easily compile the source code 102 at different levels of granularity, i.e., greater or lesser portions of the source code than a method may be compiled based on particular requirements. An article by Whaley, John ("Partial Method Compilation using Dynamic Profile Information." *Proceedings of the ACM Conference on Object-Oriented Programming Systems, Languages, and Applications* October 2001: 166–179) discloses one of such techniques for identifying sub-method granularity for dynamic compilation, which may easily be utilized by the present invention to limit recompilation to only those sub-methods. The backend section 112 of the dynamic compiler 202 generates a machine internal representation (i.e., "MIR") 204, which is described in FIGS. 4–12 below, in addition to the EXE 114, which is described above with reference to FIG. 1. The MIR 204 is a data structure, which is used to communicate between the backend section 112 and the controller 206, and vice versa. Depicted graphically, the MIR 204 is a graph where each node represents an instruction or a micro-architectural resource that is required to partially or fully execute an instruction, and each edge represents a constraint between two nodes in the graph. A constraint may be a data dependence or an underlying micro-architectural constraint for the particular target micro-architecture. As will be particularly described below with reference to FIGS. 4–12, weights may be associated with either nodes or edges or both, which represent a number of clock cycles that are expected to be needed to execute the node or to satisfy the edge's constraint. The expected time that it will take to execute an instruction schedule on target micro-architecture is a sum of the weights of a path through the instruction schedule, such that the sum is greater than or equal to the sum of weights along any other path.

The controller 206 communicates with the HPM subsystem 210. In operation, the HPM subsystem 210 receives requests from a controller 206 to count micro-architectural events, and if necessary, to monitor the micro-architectural events that may adversely affect the application, i.e., to determine whether the application is non-efficiently utilizing micro-architectural resources of the particular target micro-architecture. The HPM subsystem 210 comprises one or more HPMs 212 via which the HPM subsystem 210 may either count or monitor micro-architectural events as an application executes on a particular target micro-architecture (e.g., PowerPC 604e) and generate HPM information 214 according to the present invention as particularly described below. More specifically, the HPM subsystem 210 counts the different micro-architectural events as an application executes to identify resource utilization, stalls and the like and records the counting information in HPM information 214. As aforementioned, the execution of an instruction may stall if a value that is its input at the time of execution is not available, or if an underlying micro-architectural resource that is required by the instruction is not yet available. It is noted that for counting, the counted values are aggregated across all instructions that have executed for a determined period of time and recorder in HPM information 214, while for monitoring, the instruction and the operand address that have caused the micro-architectural event to occur are recorded in HPM information 214.

Because the counted values are aggregated across all instructions, it is not known when the controller 206 counts micro-architectural events which instruction has caused a particular micro-architectural event to occur. Thus, in the worst-case scenario all instructions that possibly may have caused a particularly micro-architectural event (e.g., first level cache miss) to occur are recompiled according to the present invention. Preferably, however, the present invention utilizes known runtime measurements 216 techniques that generate online profiling information 218 to determine which methods of the source code 102 have caused the micro-architectural event to occur, thereby limiting the methods that need be recompiled according to the present invention. More particularly, the controller 206 requests a runtime measurements component 216 to generate online profile information 218, detecting where the application is spending most of its execution time and identifying those methods where most of the execution time is spent as hot methods. It is noted that the hotness of the method is a ratio of the amount of time spent executing the method over the total amount of time spent so far executing the application. Once the hot methods are identified and returned to the controller 206, the controller 206 will determine if those hot methods should be recompiled according to the present invention. An article by Arnold, Mathew, et al. ("Adaptive Optimization in the Jalapeno JVM." *Proceedings of the ACM Conference on Object-Oriented Programming Systems, Languages, and Applications* October 2000: 47–65) discloses one of such techniques for identifying hot methods, which may easily be utilized by the present invention to limit recompilation to only those methods that are hot.

Further with reference to FIG. 2, for either counting or monitoring, the controller 206 specifies via a request to the HPM subsystem 210, a time interval, a micro-architectural resource (e.g., first level cache) and a micro-architectural event for the resource (e.g., cache miss) that is to be observed by the HPM subsystem 210. Additionally, in the case of a monitoring request, the controller 206 also specifies a number of times the micro-architectural event occurs (i.e., a count value) before sampling an instruction. Given the controller's request to count or monitor, the HPM subsystem 210 via an HPM 212 counts or monitors the micro-architectual event for the spectified time interval. The HPM subsystem 210 via HPM 212 packages It's monitoring or counting information for the controller 206 in HPM information 214. More particularly, for a controller's request to count, the HPM subsystem 210 generates HPM information 214, which includes: 1) a micro-architectural event counted; 2) a time interval over which the micro-architectural event occured during the interval of time. After receiving a response to the counting request in the form of HPM information 214, the controller 206 may determine to monitor the identified micro-architectural event to event to occur. The interaction between the counting and monitoring requests will be described in greater detail with reguard to FIG. 3 below. However, for a controller's request to monitor, the HPM subsystem 210 via HPM 212 generates HPM information 214, which includes: 1) a micro-architectural event monitored; 2) a time interval over which the micro-architectural event is counted; 3) a monitor's threshold that represents the number of times the micro-architectural event occurs before an instruction address and operand address are monitored; and 4) a list of triples each of ehich includes: i) the instruction address; ii) the operand address if the instruction's address includes a memory location; and iii) a count that represents the number of times the instruction address and the operand address were counted.

Still further with reference to FIG. 2, based on die MIR 204, the controller 206 makes decisions about what micro-architectural events the HPM subsystem 210 counts and/or monitors. More particularly, the controller 206 re-computes a machine internal representation MIR 204 from HPM information 214 generated by the HPM subsystem 210 via HPM monitors 212, compares the controller re-computed MIR 204 with the backend section generated MIR 204, and makes decisions about when the backend section 112 should re-generate the EXE 114. The controller 206 directs the backend section 112 of the dynamical compiler 202 to re-generate the EXE 114 from the re-computed MIR 204 when the weight of one or more nodes or edges or both in the re-computed MR 204 are different from the MIR 204 generated by the backend section 112. This will become clear with reference to the description of FIG. 3 below. Additionally, the controller 206 further uses the machine model 110 to determine the micro-architectural specific delays in clock cycles that may occur for different micro-architectural events. For example, for a first level cache miss it may take 10 clock cycles to retrieve a value from a second level cache, and for a second level cache miss it may take 100 clock cycle to retrieve a value from main memory. Therefore, if the controller 206 determines from examining the HPM information 214 that a first level cache miss has occurred, the controller 206 uses the cost of a first level cache miss that is determined from the machine model 110 to change the weight of the appropriate nodes or edges or both in the controller re-computed MIR 204 and directs the backend section 112 of the dynamical compiler 202 to re-generate the EXE 114 from the re-computed MIR 204.

Figure 3:
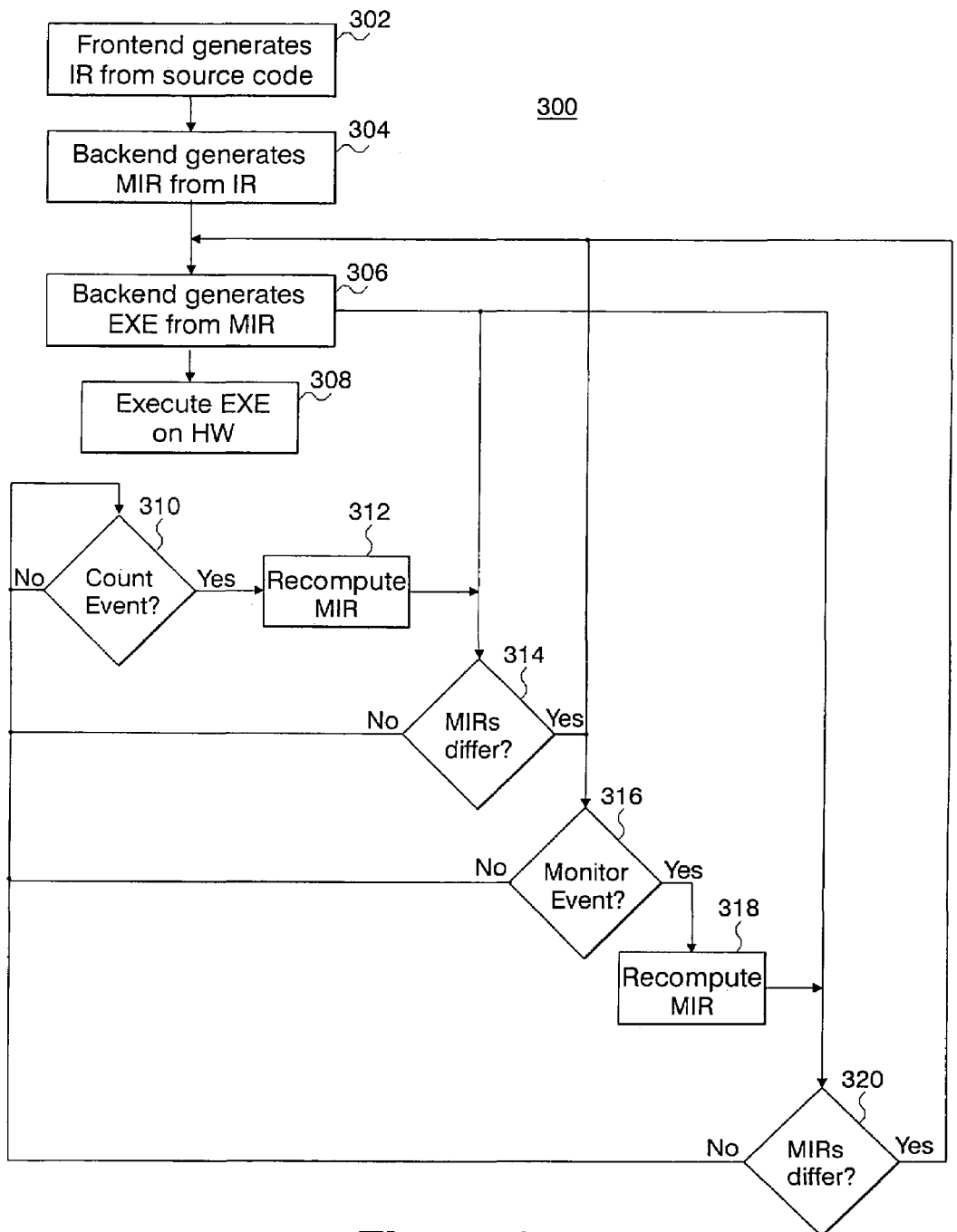
FIG. 3 is an exemplary illustration of a method flowchart of an adaptive optimization system utilizing hardware performance monitors in accordance with FIG. 2 to improve performance of an application according to the present invention.

FIG. 3 is an exemplary illustration of a method flowchart 300 for the AOS 208 utilizing the HPM subsystem 210 of FIG. 2 to improve performance of an application according to the present invention. At step 302, the frontend section 104 generates intermediate representation IR 106 from an application's source code 102. At step 304, the backend section generates MIR 204 from the IR 106. At step 306, the backend section 112 generates an executable EXE 114 from the MIR 204. Thereafter, at step 308, the EXE 114 is executed on particular target micro-architecture, e.g., PowerPC 604e. The MIR 204 generated by the backend section 112, which is used to generate the EXE 114 at step 306 is subsequently used in a comparison steps 314 and 320 and may be replaced by a MIR 204 re-computed by the controller 206. Thus, the MIR 204 that is utilized by the backend section at step 306 to generate the EXE 114 is hereinafter referenced as a current MIR 204 and the MIR that is re-computed by the controller 206 at steps 312 and 318 is hereinafter referenced as re-computed MIR 204. It is noted that a unit of compilation generated by the backend section 112 of the dynamic compiler 202 is generally a code section in the application's source code 102, and more typically is a method in the application's source code 102. Thus, when a compiled method is invoked (i.e., executed) on the target micro-architecture at step 308, a current MIR 204, whether generated by the backend section 112 or re-computed by the controller 206, is used at step 306 to generate the EXE 114 (i.e., compiled method). Sometimes an executing method may need to be replaced with a re-compiled method (i.e., from a re-computed MIR 204) during execution of that method. There are generally two known mechanisms for dealing with a previous invocation of a method that has not yet completed executing and that has activation records on a call stack. The first mechanism directs that nothing be done while activation records are live on the call stack and the method invocation or execution has not yet completed. The second mechanism directs on-stack replacement of the activation records of the executing method with activation records associated with a newly generated executable method (i.e., EXE 114), performing an appropriate mapping of data from the old activation records to the new activation records on the call stack. On-stack replacement is generally disclosed in U.S. Pat. No. 6,223,340 to Detlefs. Below is described the operation of the controller 206 with regard to: 1) counting micro-architectural events on the particular target micro-architecture; and 2) monitoring micro-architectural events on the particular target micro-architecture.

Further with regard to FIG. 3, at step 310 the controller 206 determines whether to request the HPM subsystem 210 to count a micro-architectural event. More particularly, the controller 206 examines the current MIR 204 used by the backend section 112 at step 306 to get an indication of micro-architectural events that may be important to count. For example, if the current MIR 204 has a lot of load instructions, the controller 206 may request that the HPM subsystem 210 count cache misses; or, if the MIR 204 has a lot of integer instructions, the controller 206 may request that the HPM subsystem 210 count the number of times the integer unit stalls. If the controller 206 decides not to count any micro-architectural events currently, the controller 206 waits a predetermined amount of time before again determining whether to request the HPM subsystem 210 to count a micro-architectural event at step 310. The controller 206 will determine not to request the HPM subsystem 210 to count any micro-architectural events if the "hot" code regions (i.e., hot methods) have not changed since the last time that the controller 206 made a request to count, which did not cause the backend section 112 to regenerate an executable EXE 114. However, if the controller determines to request the HPM subsystem 210 to count an event, the controller 206 re-computes the MIR 204 using the HPM information 214 generated by the HPM subsystem 210 via one or more HPMs 212. Thereafter, the current MIR 204 generated from step 306 and the re-computed MIR 204 from step 312 are compared at step 314 to determine whether any node or edge weight is different in the current and re-computed MIR 204. If at step 314, the current MIR 204 from step 306 and the re-computed MIR 204 from step 312 are not different, the method flowchart 300 continues at step 310 where the controller 206 determines whether it should count some other micro-architectural event or whether it should wait. However, if the current MIR 204 from step 306 and the re-computed MIR 204 from step 312 are determined to be different at step 314, the controller 206 instructs the backend section 112 at step 306 to re-generate the EXE 114 from MIR 204 re-computed by the controller 206 at step 312. The regenerated EXE 114 is then executed on the particular target micro-architecture, e.g., PowerPC 604e. After the backend section 112 re-generates the EXE 114 at step 306, the MIR 204 re-computed by the controller 206 at step 312 becomes the current MIR 204.

Yet further with regard to FIG. 3, the method flowchart 300 continues at step 316 where the controller 206 determines whether to request the HPM subsystem 210 to monitor the counted micro-architectural event to determine which instruction is causing the counted micro-architectural event to occur. If at step 316, the controller 206 determines to not monitor the counted event, the method flowchart 300 continues at step 310 where the controller 206 determines whether to monitor some other event or to wait. Because of overhead considerations, it is preferable that the controller 206 does not request the HPM subsystem 210 to monitor a micro-architectural event if there is only one instruction that could have possibly caused the micro-architectural event to occur. Otherwise, the method flowchart 300 continues at step 318, where the controller 206 utilizes HPM information 214 generated by HPM 212 of the HPM subsystem 210 during monitoring of the micro-architectural event to re-compute the MIR 204. At step 320, the re-computed MIR 204 generated by the controller 206 at step 318 is compared against the current MIR 204 from step 306. If no node or edge weight in re-computed MIR 204 generated at step 318 is different from current MIR 204 from step 306, then the method flowchart 300 continues at step 310 where the controller 206 determines whether some other event should be counted or whether it should wait. Otherwise, the method flowchart 300 continues at step 306 where the backend section 112 generates the EXE 114 from the re-computed MIR 204 generated by the controller 206 at step 318, and the EXE 114 is executed on the particular target micro-architecture, e.g., PowerPC 604e. After the backend section 112 re-generates the EXE 114 at step 306, the MIR 204 re-computed by the controller 206 at step 312 becomes the current MIR 204.

FIGS. 4–12 represent a series of exemplary illustrations that depict the adaptive optimization system utilizing hardware performance monitors to improve the performance of an application while the application executes, according to the present invention. More particularly, FIG. 4 is an exemplary illustration of pseudo code 400 that comprises a doubly nested loop of high-level programming language statements, in which an inner loop 401 comprises statements 402, 404 and 406 (i.e., in C/C++), which access a one-dimensional array A to successively compute a value of a point as a sum of its two neighbors and that access a two-dimensional array C to compute a value of a point as the loop index plus a value of another point. The inner loop 401 of pseudo code 400 is used throughout FIGS. 5–12 to demonstrate in exemplary fashion how an executable EXE 114 is generated from a machine internal representation MIR 204 with the help of the HPM subsystem 210 and controller 206, as particularly described above with reference to FIGS. 1–3.

Figure 5:
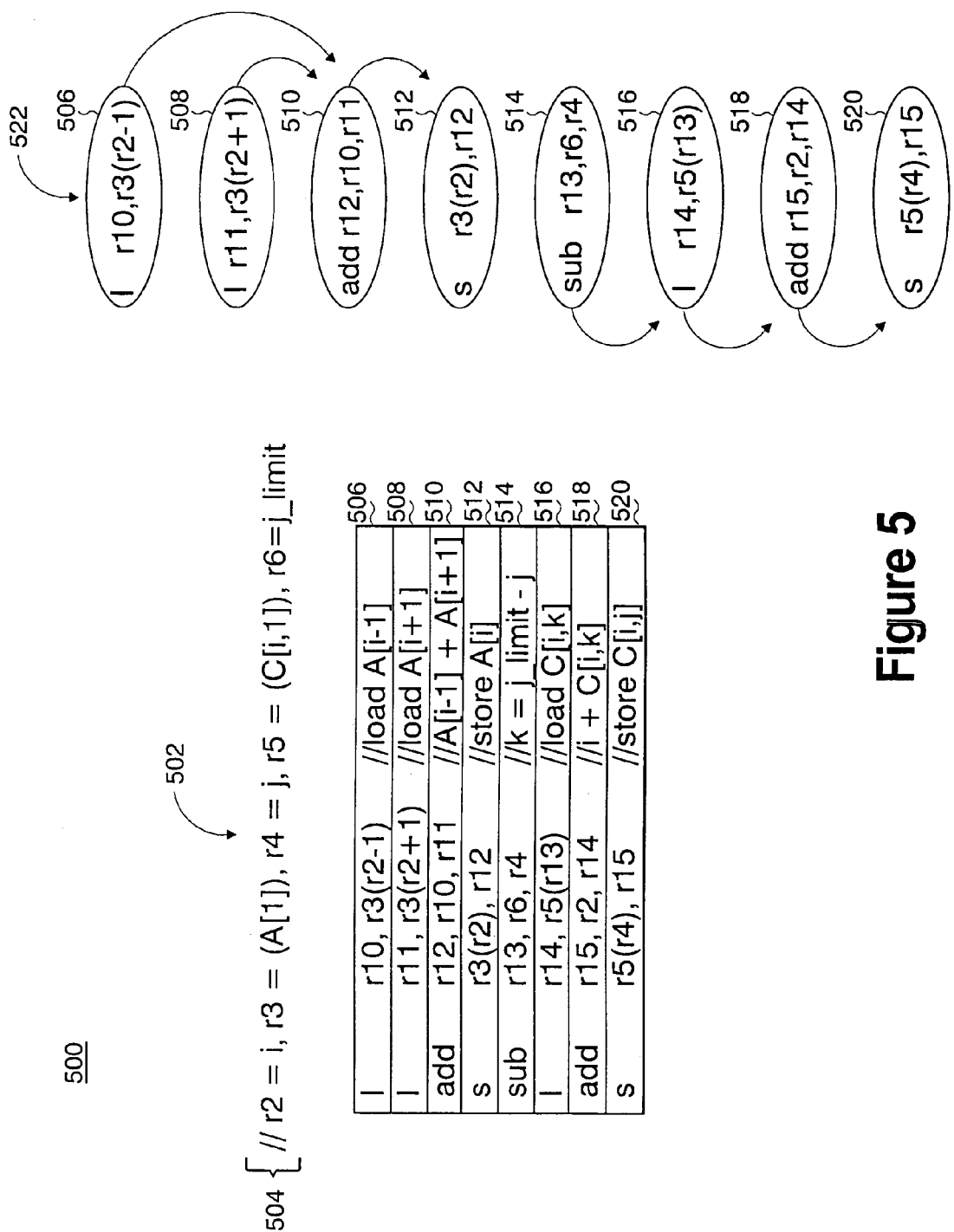

FIG. 5 is an exemplary illustration of an instruction schedule 500 of statements of the inner loop 401 for pseudo code 400 of FIG. 4. The left-hand-side of instruction schedule 500 depicts an executable 502 as a sequence of pseudo machine instructions 506–520 on a particular target micro-architecture that are generated by the backend section 112 to execute the statements 402, 404 and 406 of the inner loop 401 depicted in FIG. 4. The instruction schedule 500 is an example of an executable EXE 114 that the backend section 112 generates. The backend section 112 generated the instructions by taking each statement 402, 404 and 406 of the inner loop 401 one at a time and in order, and, for each statement, generating a sequence of one or more machine instructions 506–520. For example, the statement 402 (i.e., A[i]=A[i−1]+A[i+1]) results in four machine instructions: load A[i−1] 506; load A[i+1] 508; add A[i−1] and A[i+1] 510; and store A[i] 512. Other statements 404 and 406 are similarly described by machine instructions 514–520. For example, statement 404 (i.e., k=j_limit-j) results in one machine instruction 514 that subtracts j from j_limit, which are stored respectively in registers r4 and r6, and stores the result in a register r13. The comment 504 lists assumptions for the contents of registers on the particular target micro-architecture at the start of the instruction schedule 502. For example, register r2 contains the value of the induction variable i, and register r3 contains the address of array A at index 1. The right-hand-side of instruction schedule 500 is a graphical representation 522 of the instruction schedule 500 in which instructions are depicted as nodes and data dependencies between nodes as edges. For example, in order to execute instruction 510 (i.e., A[i−1] +A[i+1]), both instructions 506 (i.e., load A[i−1]) and 508 (i.e., load A[i−1]) must first be executed because instruction 510 is data dependent on the values that are loaded by instructions 506 and 508 (i.e., load A[i−1] and load A[i+1]). The instruction schedule 500 (as depicted in representation 522) is one example of a "valid" instruction schedule. An instruction schedule is valid as long as the data dependencies between instructions (or nodes) are maintained. That is, the node at the tail end of an edge must be scheduled before the node at the head end of an edge. Additionally in this regard, any instruction schedule that maintains the data dependencies represents a valid instruction schedule.

Figure 6:
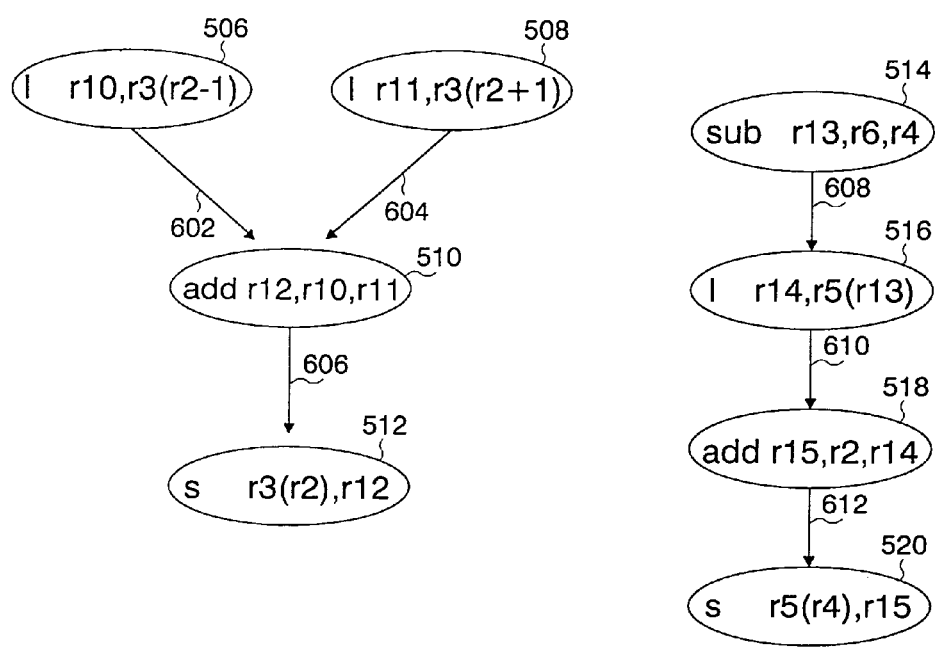

FIG. 6 is an exemplary data dependence graph 600, which is an alternative to the graphical representation 522 of the instruction schedule 500 according to FIG. 5. Although the nodes and edges in the instruction schedule 500, as depicted in the graphical representation 522, are the same as the nodes and edges in the data dependence graph 600, the nodes in the data dependence graph 600 are laid out topographically such that all nodes that have no data dependencies on other nodes are laid out first. The backend section 112 utilizes the data dependence graph 600 to generate an instruction schedule as follows: a node is scheduled for execution when all nodes that depend on that node have been scheduled for execution. For example, the node representing instruction 518 (i.e., add r15, r2, r14) may be scheduled only after the node representing instruction 516 (i.e., load r14, r5(r13)) is scheduled because one of the values that is added must first be loaded. Utilizing the data dependence graph 600, the backend section 112 may interleave instructions 506–520 from different statements 402–406. Interleaving the instructions provides the backend section 112 with more choices to generate a "valid" instruction schedule. For example, the node representing instruction 512 (i.e., store r3(r2), r12) may be scheduled after the node representing instruction 518 (i.e., add r15, r2, r14) or before the node representing instruction 516 (i.e., load r14, r5(r13)) because there are no data dependencies between instruction 512 and instructions 516 and 518.

Figure 7:
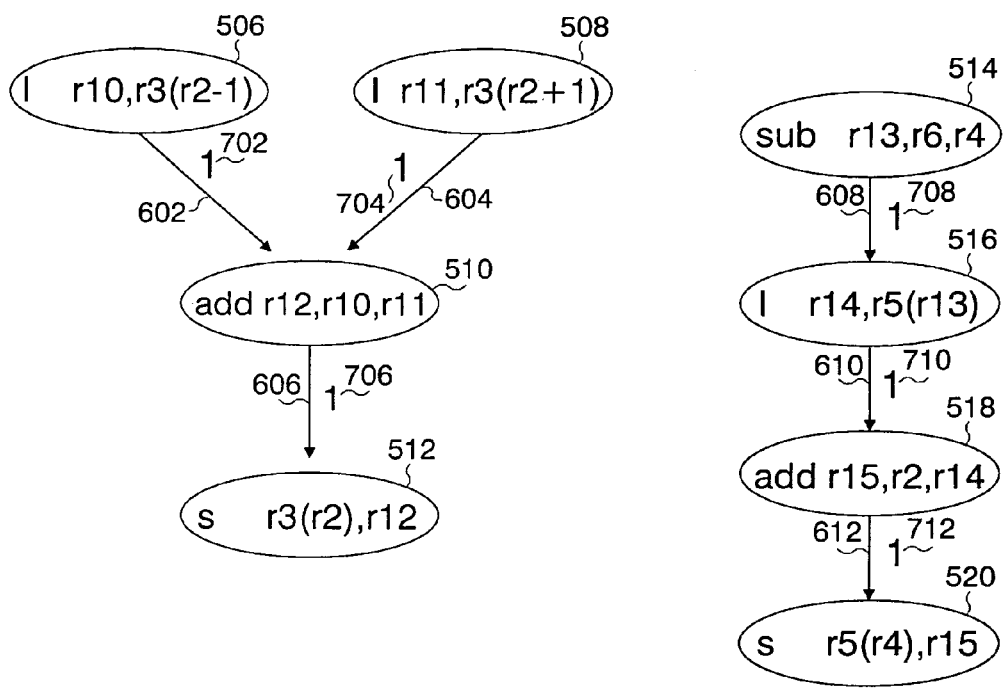

FIG. 7 is an exemplary weighted data dependence graph (i.e., WDG) 700, which represents an exemplary machine internal representation MIR 204 that a backend section 112 may utilize to generate an executable EXE 114. In general, a weighted data dependence graph associates weights with nodes, or edges or both of a data dependence graph. In particular, the WDG 700 associates weights 702–712 with edges of the data dependence graph 600. The weights associated with the edges represent latency or delay in clock cycles that indicate how soon a node at the head of an edge may start to execute after a node at the tail end of the edge has started to execute on a particular target micro-architecture. Weights help the backend section 112 generate an executable EXE 114 by choosing a node available to be scheduled for execution, such that the weight of its highest incoming edge is lower than the highest weight of any incoming edge to other nodes that are available to be scheduled for execution on the target micro-architecture. For example, assuming for the moment that edge 602 of node 506 has a weight 702 equal to 10 clock cycles and edge 604 of node 508 has a weight 704 equal to 100 clock cycles and edge 608 of node 514 has a weight 708 equal to 10 clock cycle, if nodes 510 and 516 are available to be scheduled, then node 516 will be scheduled, because the highest weight of an incoming edge to node 516 is lower than the highest incoming weight of node 510. As will be described in more detail with reference to FIGS. 9–12, because there is no dynamic or run-time information about the latency of instructions, the backend sections 112 generates the weights from consulting the machine model 110, which provides latency information about the underlying target micro-architecture. Although some instructions may have variable latencies, the backend section 112 initially chooses the most optimistic latencies for the outgoing edges of these instructions. An example of an instruction with variable latency is a load instruction. A load instruction's latency depends on where the value, which is loaded, resides in a memory hierarchy. For example, it may take one (1) clock cycle to load a value from a first level cache; ten (10) clock cycles from the second level cache; and one hundred (100) clock cycles from main memory. Therefore, the backend section 112 makes an optimistic assumption that all values are stored in a first level cache and take only one clock cycle to load. As particularly illustrated in the WDG 700 of FIG. 7, weights 702, 704 and 710 of outgoing edges 602, 604, and 610 for load instructions 506, 508 and 516 have a weight of one.

Figure 8:
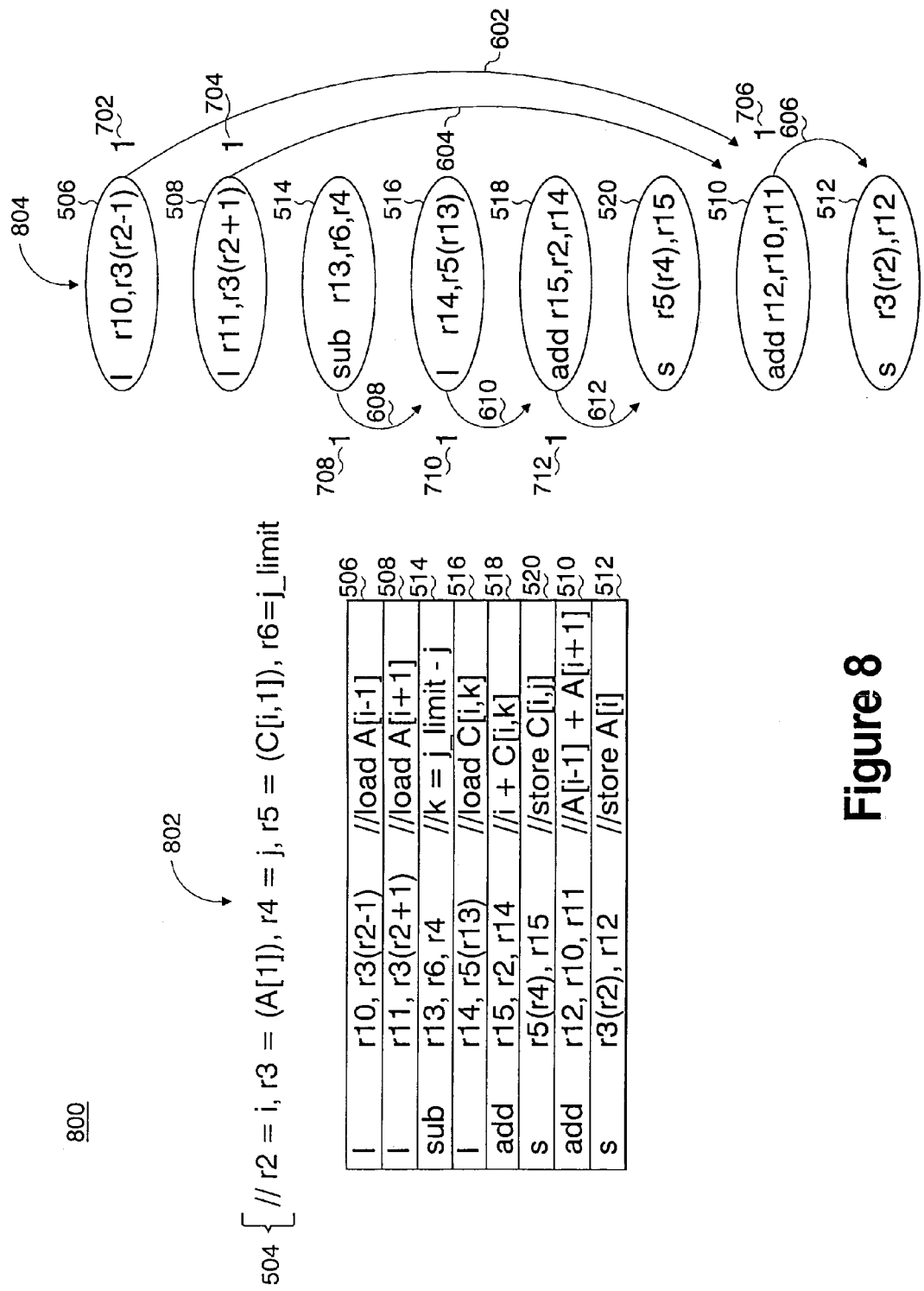

FIG. 8 is an exemplary illustration of an instruction schedule 800 utilizing the weights of the weighted dependence graph WDG 700 (assuming weights=1) and heuristics 108 to generate the instruction schedule. Although weights help the backend section 112 to schedule execution of a node when there is a plurality of nodes whose incoming edges have different weights, the backend section 112 utilizes heuristics 108 when there is a plurality of nodes whose incoming edges have the same weights. For example, the backend section 112 may schedule either instruction 506 (i.e., load of A[i−1]), or instruction 508 (i.e., load of A[i+1]), or instruction 514 (i.e., k=j_limit-j) as a first instruction for execution. Because a goal of the backend section 112 is to generate an instruction schedule that minimizes the time necessary to execute the instructions 506–520 on the target micro-architecture, the heuristics 108 provide help necessary to determine which instruction is scheduled first when all possible nodes representing instructions have the same associated weight. For FIG. 8 the following exemplary heuristics 108 are used: schedule load instructions before arithmetic instructions; and schedule arithmetic instructions before store instructions. The left-hand-side of instruction schedule 800 depicts an executable 802 as a sequence of pseudo machine instructions 506–520 that are generated when the backend section 112 utilizes the WDG 700 of FIG. 7 and the simple heuristics 108 noted above. The right-hand-side of instruction schedule 800 is a graphical representation 804 of the executable 802 in which nodes representing instructions 506–520 are linearized according to the executable 802. The edges in the graphical representation 804 depict data dependencies and the weights depict latencies.

Further with reference to FIG. 8, the instruction schedule 800 is generated as follows. From WDG 700, either load instruction 506 (i.e., load A[i–1]) or load instruction 508 (i.e., load A[i+1]) may initially be scheduled because neither instruction's data depends on any other scheduled instruction. The backend section 112 then non-deterministically schedules instruction 506 (i.e., load A[i–1]) to be executed before load instruction 508 (i.e., load A[i+1]). That is, either instruction 506 or 508 is available to be scheduled for execution, and the backend section 112 non-deterministically or randomly chooses one instruction to be executed first. However, because the heuristics 108 directs load instructions to be scheduled before arithmetic instructions, the subtract instruction 514 (i.e., k=j_limit-j) may not be scheduled before the two load instructions even though the subtract instruction 514 had no data dependency on any other instruction. Thus, after the two scheduled load instructions 506 and 508 are scheduled, the WDG 700 illustrates that either subtract instruction 514 (i.e., k=j_limit-j) or add instruction 510 (i.e., A[i–1]+A[i+1]) may be scheduled next. The backend then non-deterministically (i.e., randomly) schedules the subtract instruction 514 (i.e., k=j_limit-j) as the next instruction for execution. From WDG 700, either the add instruction 510 (i.e., add A[i–1]+A[i+1]) or the load instruction 516 (i.e., load C[i,k]) may be scheduled next. Because the heuristics 108 directs that load instruction be scheduled before arithmetic instructions, the backend section 112 schedules the load instruction 516 as the fourth instruction for execution. At this point from the WDG 700, either the add instruction 510 (i.e., add A[i–1]+A[i+1]) or the add instruction 518 (i.e., add i+C[i,k]) may be scheduled next. The backend section 112 non-deterministically schedules instruction 518 as the fifth instruction for execution. Now the WDG 700 illustrates that either the add instruction 510 (i.e., add A[i–1]+A[i+1]) or the store instruction 520 (i.e., store C[i,j]) may be scheduled next. It is noted, however, that store instruction 512 (i.e., store A[i]) cannot yet be scheduled because it has a data dependency based on the execution of instruction 510(i.e., add A[i–1]+A[i+1]). Because the heuristics 108 direct that store instructions should be scheduled before arithmetic instructions, the backend section 112 non-deterministically schedules the store instruction 520 (i.e., store C[i,j]) as the sixth instruction for execution. Finally, the WDG 700 forces the backend section 112 to schedule the add instruction 510 and then the store instruction 512 because of the data dependency between the two instructions.

Figure 9:
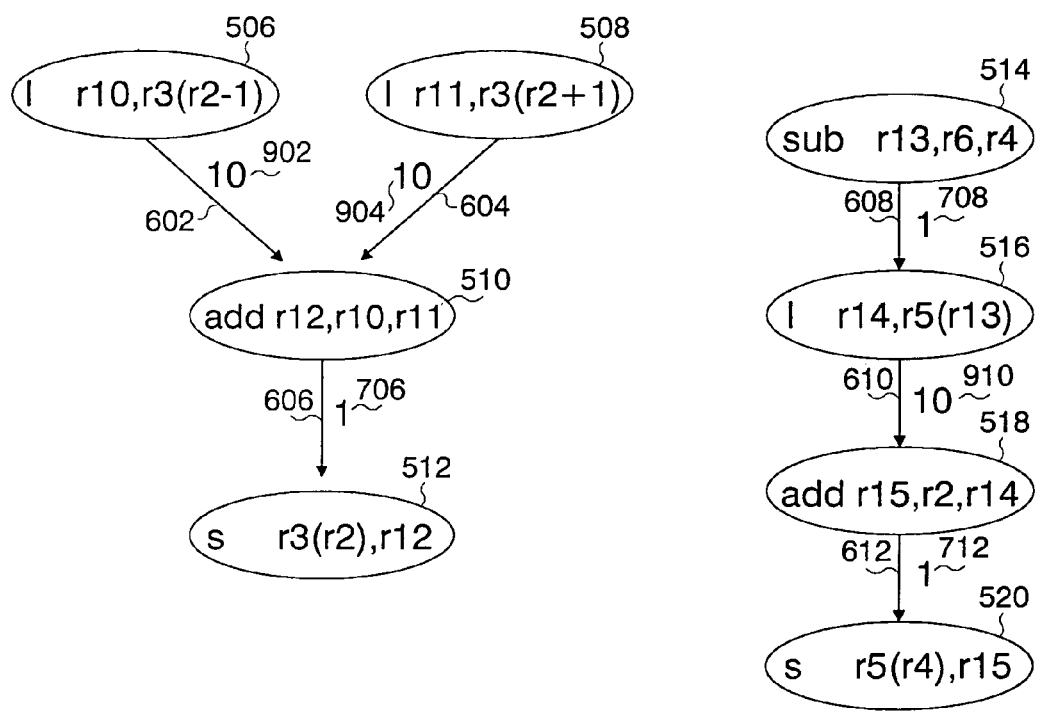

FIG. 9 is an exemplary weighted data dependence graph (i.e., WDG) 900 in which latencies (i.e., weights) of edges, which represent data dependencies between instructions 506–520, are inferred from the counts (i.e., in the form of HPM information 214) generated by HPM subsystem 210 via HPMs 212. In FIGS. 7 and 8 above, backend section 112 used optimistic assumptions about latency (i.e., weights=1) to schedule instructions 506–520, i.e., the backend section 112 assumed that all values were loaded from a first level cache. However, sometimes the optimistic assumptions are incorrect and may result in first level cache misses. The HPM subsystem 206 may help to determine when the assumptions utilized by the backend section 112 in scheduling instructions are incorrect. More particularly, assume that the controller 206 has knowledge from the HPM subsystem 210 that there is an unusually high number of first level cache misses. Although the controller 206 does not know which instruction or instructions are causing the cache misses, the controller 206 now assumes that all values are loaded from the second level cache, thereby attempting to hide latencies associated with accessing the second level cache (e.g., 10 clock cycles) as compared to a first level cache (e.g., 1 clock cycle). As mentioned above, an edge's weight represents the latency or delay in clock cycles before the node at the head of the edge may execute after the node at the tail of the edge has started to execute. Thus, the controller 206 generates the WDG 900 in which the outgoing edges 602, 604, and 610 associated with nodes representing load instructions 506, 508 and 516 have respective weights 902, 904 and 910 of 10 clock cycles, i.e., the number of clock cycles required to retrieve a value from the second level cache. As described with reference to FIGS. 2 and 3 above, because the WDG 900 generated by the controller 206 is different from the WDG 700 generated by the backend section 112, the controller 206 notifies the backend section 112 to re-generate the executable EXE 114 from the WDG 900 (instead of the WDG 700), thereby attempting to hide latencies associated with accessing data from the second level cache.

Figure 10:
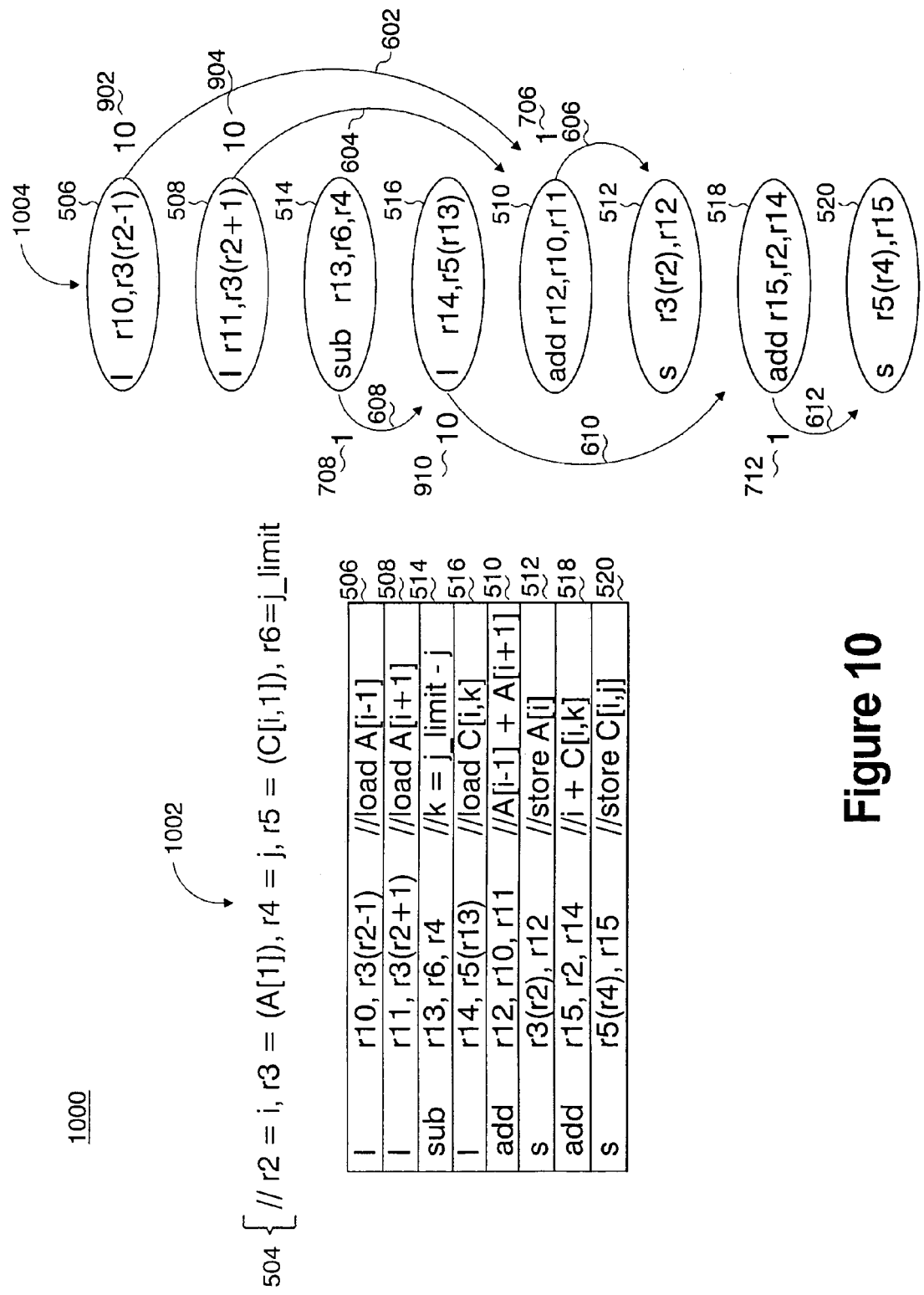

FIG. 10 is an exemplary illustration of an instruction schedule 1000 generated by utilizing the weights of the weighted dependence graph WDG 900, which are inferred from the counts (i.e., in the form of HPM information 214) generated by the HPM subsystem 210 via HPM 212. The left-hand-side of instruction schedule 1000 depicts an executable 1002 as a sequence pseudo machine instructions 506–520 generated when the backend section 112 utilizes the WDG 900 and the heuristics 108. The weights help the backend section 112 generate an executable EXE 114 by choosing a node available to be scheduled for execution, such that the weight of its highest incoming edge is lower than the highest weight of any incoming edge to other nodes that are available to be scheduled for execution on the target micro-architecture. Referring for a moment to the WDG 900, all incoming edges to instructions that are data dependent on a load instruction have a greater weight (i.e., weight=10) than the weight of all other edges (i.e., weight=1). The load instructions 506 and 508 are scheduled before the subtraction instruction 514 because load instructions are to be scheduled before arithmetic instructions according to heuristics 108. Now the add instruction 510 and the subtraction instruction 514 are to be scheduled next. Because the weight of the highest incoming edge to instruction 510 is equal to ten (weights associated with instructions 506 and 508), while the weight of the highest incoming edge to instruction 514 is zero because instruction 514 has no incoming edges, instruction 514 is scheduled for execution before instruction 510. Due to the heuristics 108, which directs load instructions to be scheduled for execution before arithmetic instructions, the load instruction 516 is scheduled for execution before the add instruction 510. After instruction 516 is scheduled, the WDG 900 illustrates that only the add instruction 510 or add instruction 518 can be scheduled and both are dependent on load instructions. Therefore, the backend section 112 non-deterministically (i.e., randomly) chooses instruction 518 which then causes instruction 520, which is not data dependent on a load instruction, to be scheduled before the add instruction 510.

Figure 11:
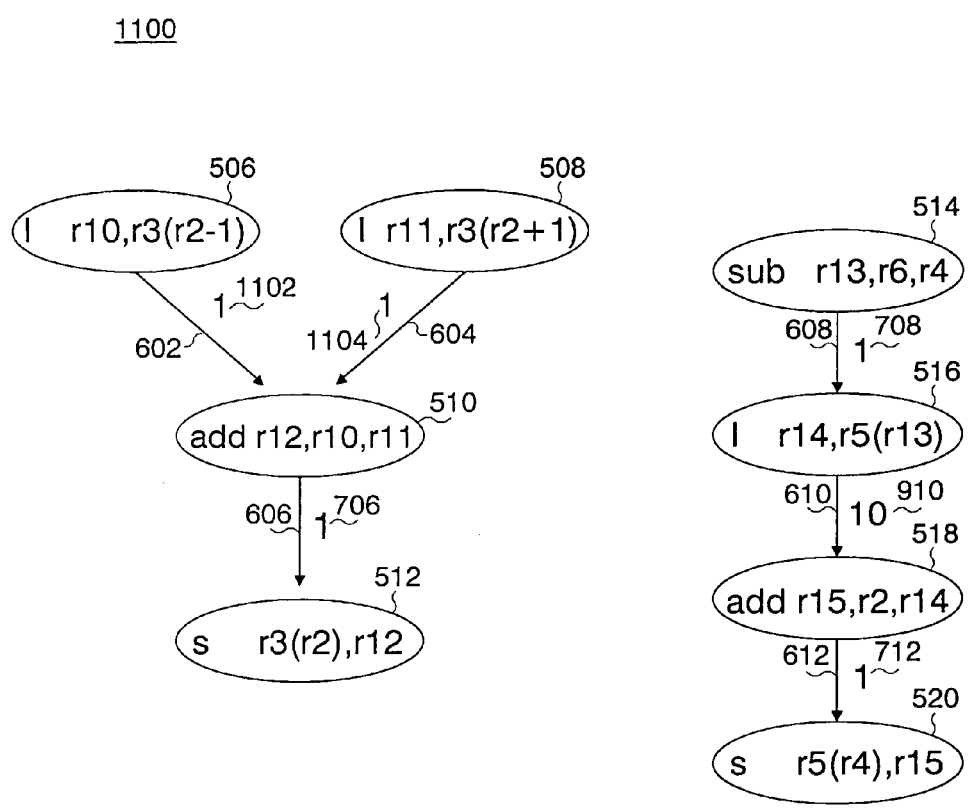

Further with reference to FIG. 10, the right-hand-side of instruction schedule 1000 is a graphical representation 1004 of the executable 1002 in which nodes representing instructions 506–520 are linearized according to the executable 1002. As before, edges depict data dependencies and edge weights depicts latencies. The backend section 112 assumes that all load instructions 506, 508 and 516 miss in the first level cache and hit in the second level cache. The controller 206 may instruct the HPM subsystem 210 to count second level cache misses to determine whether the load instructions 506, 508 and 516 also miss in the second level cache. However, assuming that all values reside in the second level cache, the HPM subsystem 210 determines via monitoring which particular load instruction or instructions miss in the first level cache. More particularly, once the controller 206 knows that there is a high first level cache miss rate for the execution of the inner loop 401 and there are multiple loads that could miss, it instructs the HPM subsystem 210 to monitor first level cache misses to determine which instruction or instructions cause the misses. As described with reference to FIGS. 2 and 3 above and with reference to FIG. 11 below, the controller 206 then uses monitoring information (i.e., HPM information 214) to generate a weighted data dependence graph in which only the load instruction or instructions that have been identified to miss the first level cache have assigned outgoing edges of weight 10. FIG. 11 is an exemplary weighted data dependence graph (i.e., WDG) 1100 generated by controller 206 in which weights of edges, which represent the data dependencies between instructions 506–520, are inferred from monitoring information (i.e., in the HPM information 214) generated by HPM subsystem 210 via HPM 212. More particularly, assume that the RPM subsystem 210 monitoring information reveals that only the load instruction 516 (i.e., load C[i,k]) causes misses in the first level cache. Therefore, outgoing edges 602 and 604 from instructions 506 and 508 are assigned respective weights 1102 and 1104 (i.e., one clock cycle each) because they do not miss in the first level cache, while edge 610 retains weight 910 (i.e., ten clock cycles) because it misses in the first level cache and is assumed to be in a second level cache. It is noted that controller 206 consults the machine model 110 to determine what is the latency of load instruction that misses in the first level cache.

Figure 12:
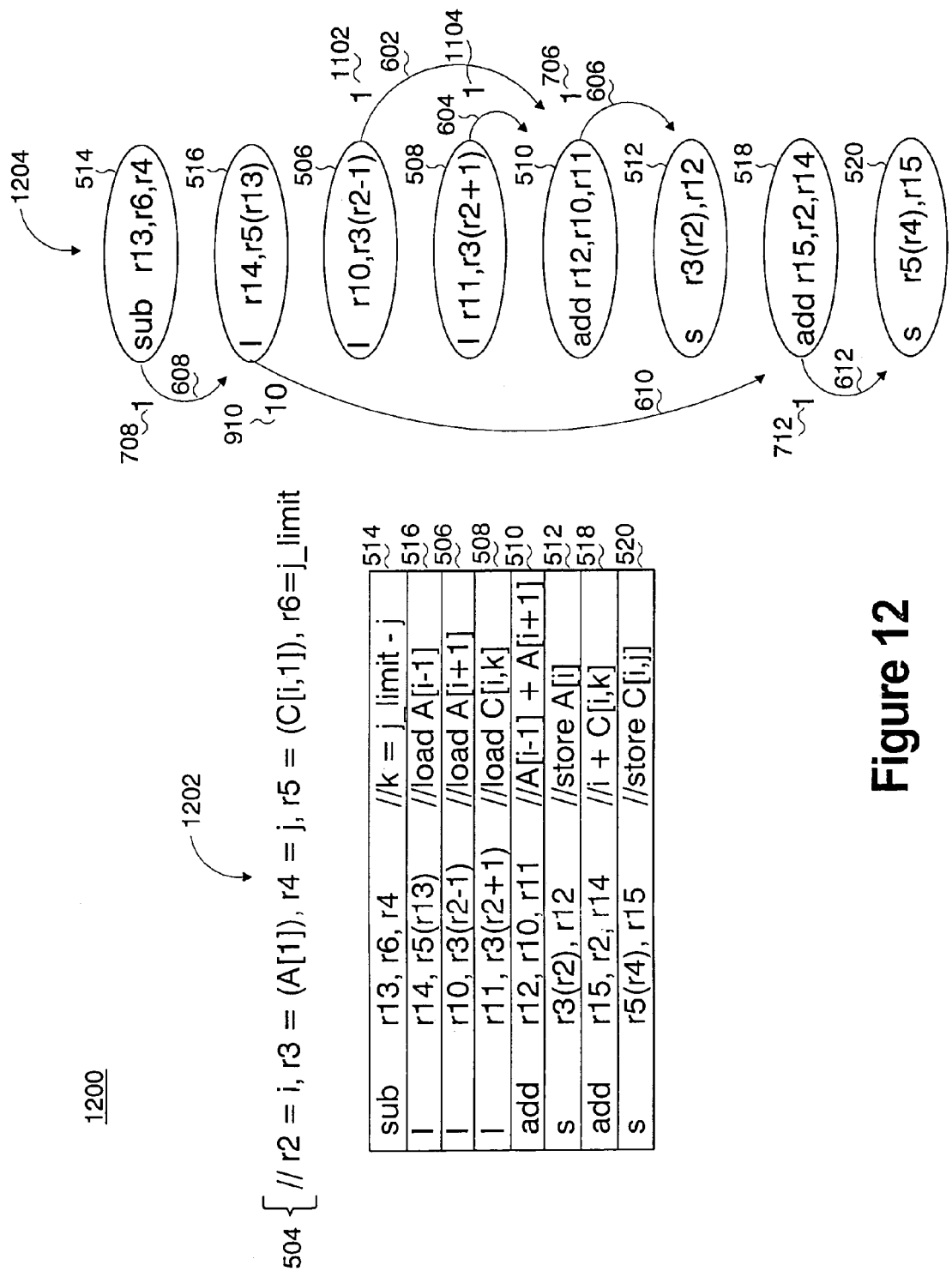

FIG. 12 is an exemplary illustration of an instruction schedule 1200 that utilizes the weights of the weighted dependence graph WDG 1100 of FIG. 11 using monitoring information (i.e., HPM information 214) generated by the HPM subsystem 206 and heuristics 108 to generate the instruction schedule. The left-hand-side of instruction schedule 1200 depicts an executable 1202 as a sequence of pseudo machine instructions 506–520 that are generated when the backend section 112 utilizes the heuristics 108 and the WDG 1100 of FIG. 11, where the weights assigned are based on monitoring information (i.e., HPM information 214), and machine model 110. The right-hand-side of instruction schedule 1200 is a graphical representation 1204 in which nodes representing instructions 506–520 are linearized according to the executable 1202. It is noted that in FIG. 11 it was assumed that the load instruction 516 (i.e., load C[i,k]) causes misses in the first level cache. Thus, the executable 1202 clearly depicts that the load instruction 516 (i.e., load C[i,k]) and the use of the value (i.e., C[i,k]) loaded by instruction 516 at instruction 518 are scheduled as far apart as possible, thereby hiding some of the latency caused by the first level cache miss of the load instruction 516. Therefore, when the instructions 516 and 518 are executed according to the instruction schedule 1200, a savings in execution time will be observed by utilizing the hardware performance monitors according to the present invention.

Figure 13:
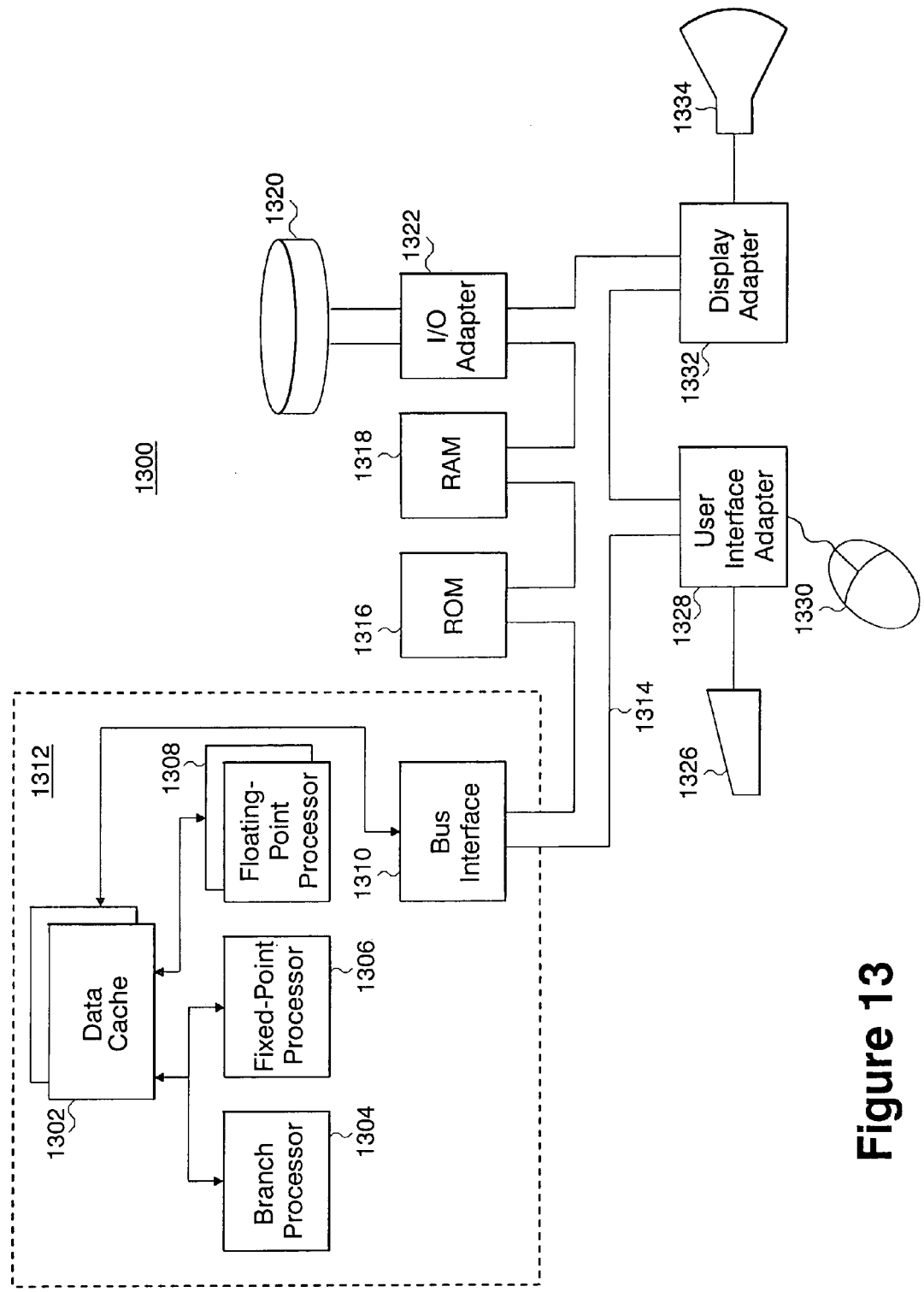
FIG. 13 is an exemplary micro-architecture that may be employed by the present invention described with reference to FIGS. 2–12.

FIG. 13 is an exemplary micro-architecture 1300 that can be employed by the present invention described with reference to FIGS. 2–12 above. The micro-architecture 1300 includes a central processing unit (i.e., "CPU") 1312, which may be a RISC microprocessor such as the PowerPC by International Business Machines (i.e., "IBM"). The CPU 1312 comprises one or more caches 1302, which communicate with a branch processor 1304, one or more fixed-point processors (i.e., "FXU") 1306 and one or more floating-point processors (i.e., "FPU") 1308 of the CPU 1312 and with other components of the micro-architecture 1300 via a bus interface 1310 over a system bus 1314. The branch processor 1304, the FXU 1306 and the FPU 1308 execute one or more instructions of an application based on data supplied by the one or more caches 1302. It is noted that the branch processor 1304 executes only branch instructions from the one or more cache 1302. Additionally, the CPU 1312 further communicates with other components of the micro-architecture 1300 over the system bus 1314. To the system bus 1314 are attached: a read only memory (i.e., "ROM") 1316; a random access memory (i.e., "RAM") 1318; an input/output (i.e., "I/O") adapter 1322; a user interface adapter 1328; and a display adapter 1332. The RAM 1318 functions as main memory to the CPU 1312 and provides temporary storage for an application's code and data, while the ROM 1316 typically includes the basic input/output system (i.e., "BIOS") code and may be implemented with flash memory or electronically programmable memory. The I/O adapter 1322, such as a small computer system interface (i.e., "SCSI") adapter, is connected to one or more disk drives 1320, such as direct access storage devices (i.e., "DASD"). The disk drive 1320 typically stores the micro-architecture's operating system (i.e., "OS"), such as IBM's AIX operating system, as well as one or more applications, which may be loaded into RAM 1318 via the system bus 1314 for execution. The user interface adapter 1328 interfaces the micro-architecture 1300 via system bus 1314 to attached keyboard 1326, mouse 1330 and other user interface devices such as a touch screen device (not shown). The display adapter 1332 interfaces the micro-architecture 1300 via system bus 1314 to a display device 1334, such as a cathode ray tube ("CRT"), a liquid crystal display ("LCD") or other suitable display device.

While the invention has been particularly shown and described with regard to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for utilizing a hardware performance monitor for improving performance of an application comprising a plurality of instructions while the application is executing on a hardware, the method comprising the steps of:

(a) creating a machine internal representation (MIR) for the plurality of instructions or a subset thereof for the hardware and generating an executable (EXE) from the MIR for execution on the hardware;

(b) directly communicating with said hardware performance monitor a request for monitoring a specified event during the execution of said executable (EXE) and generating hardware performance monitor (HPM) information for said specified event associated with a resource of the hardware during execution of the EXE to identify one or more instructions of the application that affect the execution of the application on the hardware;

(c) re-computing the MIR according to the HPM information generated in response to said HPM request; and (d) re-generating the EXE from the re-computed MIR for execution on the hardware if the MIR and the re-computed MIR are different, thereby improving utilization of the resource by the application.

2. The method for utilizing a hardware performance monitor according to claim 1, wherein the determining step further comprises a step of counting occurrences of the event associated with the resource on the hardware.

3. The method for utilizing a hardware performance monitor according to claim 2, wherein the method further comprises a step of utilizing online profiling information to identify a hot code region or method of the application for re-generating the EXE for that hot code region or method.

4. The method for utilizing a hardware performance monitor according to claim 1, wherein the generating step further comprises a step of monitoring the specified event associated with the resource on the hardware.

5. The method for utilizing a hardware performance monitor according to claim 1, wherein the method further comprises a step of substituting the MIR with the re-computed MIR.

6. The method for utilizing a hardware performance monitor according to claim 1, wherein the method further comprises a step of replacing the executing EXE with the re-generated EXE.

7. The method for utilizing a hardware performance monitor according to claim 1, wherein the subset of the plurality of instructions represents a code region or a method of the application.

8. The method for utilizing a hardware performance monitor according to claim 1, wherein the hardware is a micro-architecture.

9. A system for utilizing a hardware performance monitor for improving performance of an application comprising a plurality of instructions while the application is executing on a hardware, the system comprising:

a compiler for generating a machine internal representation (MIR) for the plurality of instructions or a subset thereof for the hardware and generating an executable (EXE) from the MIR for execution on-the hardware;

a hardware performance monitor (HPM) subsystem added for directly receiving requests for monitoring a specified event during the execution of said executable (EXE) and generating HPM information for said specified event associated with a resource of the hardware during execution of the EXE to determine one or more instructions of the application that affect the execution of the application on the hardware; and a controller for re-computing the MIR according to the HPM information generated in response to said HPM request and directing the compiler to re-generate the EXE from the re-computed MIR for execution on the hardware if the MIR and the re-computed MIR are different, thereby improving utilization of the resource by the application.

10. The system for utilizing a hardware performance monitor according to claim 9, wherein the HPM subsystem counts occurrences of the event associated with the resource on the hardware.

11. The system for utilizing a hardware performance monitor according to claim 10, wherein the controller further utilizes online profiling information generated by a runtime measurement component to identify a hot code region or a method for directing the compiler to re-generate the EXE for that hot code region or method.

12. The system for utilizing a hardware performance monitor according to claim 9, wherein the HPM subsystem monitors the event associated with the resource on the hardware.

13. The system for utilizing a hardware performance monitor according to claim 9, wherein the controller further substitutes the MIR with the re-computed MIR.

14. The system for utilizing a hardware performance monitor according to claim 9, wherein the controller further replaces the executing EXE with the re-generated EXE.

15. The system for utilizing a hardware performance monitor according to claim 9, wherein the subset of the plurality of instructions represents a code region or a method of the application.

16. The system for utilizing a hardware performance monitor according to claim 9, wherein the hardware is a micro-architecture.

17. A program storage device, tangibly embodying a program of instructions executable by a machine to perform a method for utilizing a hardware performance monitor for improving performance of an application comprising a plurality of instructions while the application is executing on a hardware, the method comprising the steps of:

(a) creating a machine internal representation (MIR) for the plurality of instructions or a subset thereof for the hardware and generating an executable (EXE) from the MIR for execution on the hardware;

(b) directly communicating with said hardware performance monitor a request for monitoring a specified event during the execution of said executable (EXE) and generating hardware performance monitor (HPM) information for said specified event associated with a resource of the hardware during execution of the EXE to identify one or more instructions of the application that affect the execution of the application on the hardware;

(c) re-computing the MIR according to the HPM information generated in response to said HPM request; and (d) re-generating the EXE from the re-computed MIR for execution on the hardware if the MIR and the re-computed MIR are different, thereby improving utilization of the resource by the application.

18. The program storage device according to claim 17, wherein the determining step further comprises a step of counting occurrences of the event associated with the resource on the hardware.

19. The program storage device according to claim 18, wherein the method further comprises a step of utilizing online profiling information to identify a hot code region or method of the application for re-generating the EXE for that hot code region or method.

20. The program storage device according to claim 17, wherein the determining step further comprises a step of monitoring the event associated with the resource on the hardware.

21. The program storage device according to claim 17, wherein the method further comprises a step of substituting the MIR with the re-computed MIR.

22. The program storage device for utilizing a hardware performance monitor according to claim 17, wherein the method further comprises a step of replacing the executing EXE wit the re-generated EXE.

23. The program storage device according to claim 17, wherein the subset of the plurality of instructions represents a code region or a method of the application.

24. The program storage device according to claim 17, wherein the hardware is a micro-architecture.

25. A hardware performance monitor (HPM) subsystem for improving performance of an application comprising a plurality of instructions while the application is executing on a hardware, the RPM subsystem comprising:
   a means for directly receiving a request for monitoring a specified event during the execution of said executable (EXE) and generating HPM information for said specified event associated with a resource of the hardware during execution of an executable (EXE) associated wit the plurality of instructions or a subset of the application to identify one or more instructions of the application that affect the execution of the application on the hardware;
   a means for directly providing the HPM information generated in response to said HPM request to a dynamic compiler system to re-generate the EXE according to the HPM information for execution on the hardware, thereby improving utilization of the resource by the application.

26. A hardware performance monitor (HPM) subsystem according to claim 25, wherein the RPM subsystem further comprises a means to count occurrences of the event associated with the resource on the hardware.

27. A hardware performance monitor (HPM) subsystem according to claim 25, wherein the HPM subsystem further comprises a means to monitor the event associated with the resource on the hardware.

* * * * *